(12) United States Patent
Nagaraj

(10) Patent No.: US 6,485,791 B1
(45) Date of Patent: Nov. 26, 2002

(54) METHOD FOR IMPROVING THE PERFORMANCE OF OXIDIZABLE CERAMIC MATERIALS IN OXIDIZING ENVIRONMENTS

(76) Inventor: Bangalore A. Nagaraj, 5196 Traverse Ct., West Chester, OH (US) 45069

( * ) Notice: Subject to any disclaimer, the term of this patent is extended or adjusted under 35 U.S.C. 154(b) by 0 days.

(21) Appl. No.: 09/544,041

(22) Filed: Apr. 6, 2000

(51) Int. Cl.$^7$ ................................................ C23C 14/30
(52) U.S. Cl. ...................... 427/452; 427/453; 427/596; 427/226; 427/255.12; 427/255.13; 427/255.18; 427/255.19; 427/255.21; 204/192.15; 204/192.16
(58) Field of Search .................. 427/452, 453, 427/596, 226, 255.12, 255.13, 255.18, 255.19, 255.21; 204/192.15, 192.16

(56) References Cited

U.S. PATENT DOCUMENTS

| 4,523,554 A | | 6/1985 | Ryu ............................ 123/193 |
| 4,599,256 A | | 7/1986 | Vasilos ........................ 428/114 |
| 4,894,286 A | | 1/1990 | Gray ............................ 428/408 |
| 5,194,330 A | | 3/1993 | Vandenbulcke et al. .... 428/336 |
| 5,246,736 A | | 9/1993 | Goujard et al. .............. 427/249 |
| 5,305,726 A | | 4/1994 | Scharman et al. ........... 123/668 |
| 5,350,599 A | * | 9/1994 | Rigney et al. ............ 427/255.7 |
| 5,536,574 A | | 7/1996 | Carter ......................... 428/381 |
| 5,622,751 A | | 4/1997 | Thebault et al. ........... 427/376.2 |
| 5,677,060 A | | 10/1997 | Terentieva et al. ........... 428/408 |
| 5,741,596 A | | 4/1998 | Skowronski et al. ........ 428/457 |
| 5,763,008 A | * | 6/1998 | Sarin et al. ................... 427/252 |
| 5,776,550 A | | 7/1998 | Disam et al. ................. 427/452 |
| 5,958,578 A | | 9/1999 | Blohowiak et al. .......... 428/336 |
| 5,965,266 A | | 10/1999 | Gouojard et al. ............ 428/408 |
| 5,985,470 A | * | 11/1999 | Spitsberg et al. ............ 428/469 |
| 6,129,954 A | * | 10/2000 | Spitsberg et al. ............ 427/452 |

* cited by examiner

*Primary Examiner*—Timothy Meeks
(74) *Attorney, Agent, or Firm*—Carmen Santa Maria; McNees Wallace & Nurick LLC

(57) ABSTRACT

Improved adhesion of thermal barrier coatings to nonmetallic substrates using a dense layer of ceramic on an underlying nonmetallic substrate that includes at least one oxidizable component. The improved adhesion occurs because the application of the dense ceramic layer forms a diffusion barrier for oxygen. This diffusion barrier prevents the oxidizable component of the substrate from decomposing. The present invention applies ceramic by a process that deposits a relatively thick and dense ceramic layer on the underlying substrate. The formation of the dense layer of ceramic avoids the problem of void formation associated with ceramic formation by most prior art thermal decomposition processes. The formation of voids has been associated with premature spalling of thermal barrier layers and other protective layers applied to substrates.

16 Claims, 1 Drawing Sheet

METHOD FOR IMPROVING THE PERFORMANCE OF OXIDIZABLE CERAMIC MATERIALS IN OXIDIZING ENVIRONMENTS

The invention herein described was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

The present invention generally relates to composite materials and specifically to the protection of silicon carbide containing materials in hot, oxidizing environments such as ceramic matrix composites (CMC's) in which at least one of the components of the CMC's includes silicon carbide (SiC). Silicon carbide containing materials have not been used in hot oxidizing atmospheres such as the combustor or turbine portion gas turbine engines for various components because of problems with oxidation of the SiC.

SiC has a tendency to oxidize, the SiC being converted into silica ($SiO_2$) and $CO_2$ at elevated temperatures. Even when coatings are utilized for protection of the underlying SiC in hot, oxidizing environments, there is a tendency for oxygen to diffuse through the coating to oxidize the SiC to form carbon monoxide, CO, or carbon dioxide, $CO_2$, and silica. This transformation also produces voids that exist in one of several places. The voids may appear in the external coating and/or in the interfacial silica scale formed by the transformation. The voids can also exist at the interfaces between the silica scale and the substrate. Of course the voids can also form tat the interface between the silica scale and the external coating. The voids are undesirable as thy decrease the environmental protection provided by any external coatings. Not only do the voids break down the SiC, which can adversely affect the mechanical properties of the CMC composite, which are designed around the mechanical properties of its system components, but also the voids can provide a path of least resistance that permits the continued inward diffusion of oxygen to promote further deterioration of the SiC composite. The voids can aggregate during the course of operation at high temperatures and can reduce the life of the external coating by promoting spallation of the applied coating.

Various systems are available for protection of carbon/carbon composites such as silicon carbide systems, from oxidation. One of these systems is a complex coating that includes an outer layer of a first coating comprising titanium diboride, colloidal silica and an intermetallic compound applied over a thin, primary coating of boronated silicon carbide as set forth in U.S. Pat. No. 5,536,574 to Carter. The invention improves the oxidation protection of a carbon/carbon composite wherein the secondary coating of diboride, colloidal silica and an intermetallic compound applied over the primary coating melts to form a crystalline glass ceramic coating. While the coatings improved oxidation protection to the substrates at temperatures of about 2400° F., the temperature capabilities and times at temperature of the crystalline glass ceramic coating formed by melting at temperatures in the range of 2200–2400° F., is limited by its melting temperature.

Other approaches such as set forth in U.S. Pat. No. 5,776,550 to Disam et al. ('550 Patent) and U.S. Pat. No. 5,741,596 to Skowronski et al. ('596 Patent) improve oxidation protection of metal substrates by utilizing variations of the glass/ceramic coatings formed of metallic silicides. The '550 patent utilizes a boron-containing silicide to form a low melting oxide mixtures that have improved crack-healing properties as compared to pure $SiO_2$. The '596 Patent teaches the use of multi-layered coatings, the last of which is a thin layer of $SiO_2$ applied by the sol-gel process.

Approaches for protecting CMC composites against oxidation are described in U.S. Pat. No. 5,246,736 to Goujard et al. This process utilizes a ternary Si—B—C system to form a borosilicate glass and avoids the drawbacks encountered when there are superposed layers of precursors for boron-based glass and for silica-based glass.

Yet another approach is set forth in Thebault et al. in U.S. Pat. No. 5,622,751 which utilizes a coating of a mixture of non-oxide refractory ceramic, refractory ceramic and a polymer to form a commingled network.

What is needed is a system that can be readily applied to a substrate of a ceramic matrix composite material that forms a barrier to diffusion of oxygen that is both easy to apply to the substrate and adherent to the substrate. The diffusion barrier must be easy to apply and be capable of maintaining its resistance to oxygen diffusion, even at temperatures of up to 3000° F. Ideally, the material should be also improve the adherence of thermal barrier coatings to the CMC substrate so that the component to which it is applied can be used in environments that experience even higher temperatures.

SUMMARY OF THE INVENTION

Improved adhesion of thermal barrier coatings to nonmetallic substrates is provided by applying a dense ceramic layer on the underlying nonmetallic substrate that includes at least one oxidizable component by appropriate methods that permits the formation of a dense ceramic coatings such as silica. The improved adhesion occurs because the application of the dense ceramic layer inhibits the penetration of oxygen by forming a diffusion barrier. This protection is required for articles such as gas turbine components designed to operate in high temperature, oxidizing atmospheres such as is found in the combustor portion of gas turbine engines and in sections of the engine downstream from the combustor portion. While silica has been used to protect substrates, it usually has been used in multi-layer systems or has been applied by application of SiC followed by thermal decomposition to yield silica and associated voids. The present invention applies silica by a process that deposits a relatively thick and dense layer of silica on the underlying CMC composite. The formation of the dense layer of silica avoids the problem of void formation associated with silica formation by thermal decomposition. Thus, the silica coating formed will not only provide protection of the underlying substrate from decomposition due to oxidation at elevated temperatures, but also will provide improved adhesion for coatings such as thermal barrier coatings applied over the component to increase its ability to perform at elevated temperatures.

An advantage of the present invention is that it forms a protective, diffusion barrier layer over the CMC composite that prevents the diffusion of oxygen through it. This prevents the deterioration of any materials present in the CMC that are subject to degradation by oxidation.

Another advantage of the present invention is directly related to the ability of the dense silica layer to inhibit form a diffusion layer. Since oxygen cannot penetrate the silica layer, the formation of voids at the interface or below the interface is prevented. As void formation is related to spalling of layers above the voids, particularly as the voids coalesce.

Another advantage is that the silica can form a strong bond with most non-metallic engineering materials that can be used as structural components in the hot portions of gas turbine engines. The typical thermal barrier coatings that overly these structural components to improve their thermal response also form are capable of forming good bonds with the dense silica.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
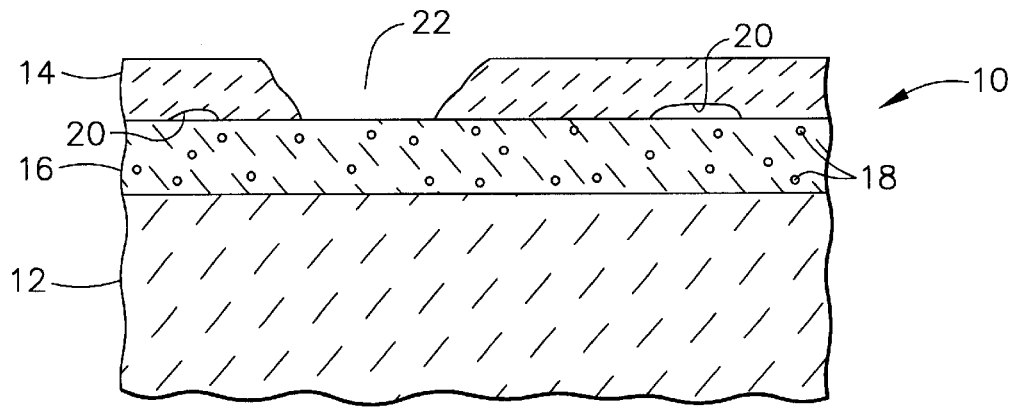
FIG. 1 is a depiction of a prior art turbine component as voids aggregate immediately prior to spallation of an outer coating layer.

FIG. 1 depicts the structure of a prior art turbine component 10 depicting a spallation mechanism of coatings overlying a non-metallic substrate. The turbine component 10 includes at least one oxidizable component, typically a carbon containing component, but could include an oxidizable, non-carbon containing component such as a nitride. At low temperatures of operation, these components operate with little or no problems throughout their lives. However, as temperatures increase in hot oxidizing atmospheres such as the atmospheres typically found in the hot section of a gas turbine engine, there is a tendency for the oxidizable component to react with excess oxygen to form stabile ceramics and a gas. The hot section of a gas turbine engine, as used herein, includes the combustor portion of the engine and the portions of the engine aft of the combustor such as the turbine stages of the engine.

Typical components used in the hot section of gas turbine engines are metallic having coatings for environmental protection and ceramic thermal barrier coatings to increase the thermal capabilities of the components at the high temperatures of operation, as non-metallic materials having the required engineering strength undergo deterioration as a result of oxidation of oxidizable components, which leads to spalling of the outer protective layers. The mode of these failures is depicted in FIG. 1. The non-metallic materials that can be used in these applications typically include at least one carbon-containing material. A monolithic material 12, such as shown in FIG. 1, that can be used is silicon carbide. When additional strength is needed, particularly when the strength is required as a result of directional stress patterns, fiber matrix composite materials, such as ceramic matrix composites, are used. These fiber matrix composites may include a wide variety of materials such as metal fibers in non-metallic matrices or non-metallic fibers in metallic matrices, they frequently include a carbon-containing material.

Although the CMC's may include inorganic fibers in inorganic matrices, more frequently, they include organic fibers in inorganic matrices or inorganic fibers in organic matrices. For high temperature use, this frequently involves graphite or silicon carbide fibers in ceramic matrices, but can include ceramic fibers in organic matrices such as silicon carbide and even organic fibers such as silicon carbide in silicon carbide matrices, referred to as SiC/SiC composites. As an example, a SiC/SiC composite oxidizes at high temperatures in oxidizing atmospheres such as are found in gas turbine engines. Ceramic thermal barrier coatings 14 are applied to the substrate so that the thermal performance of the composite can be enhanced. But at the elevated temperatures, oxygen diffuses through the coating and reacts with SiC to form a coating of $SiO_2$ 16 and CO or $CO_2$ and voids 18. At elevated temperatures, it is known that voids tend to migrate together and form an aggregate void area 20 under a coating as shown in FIG. 1. This void formation results in the occurrence of two undesirable phenomena. First, oxygen can quickly migrate into the remaining SiC across the $SiO_2$ and along and across the voids, as no barriers to diffusion exist along these boundaries. This enhances the further oxidation of the SiC. As the voids aggregate and form a critical size, the adherence of the overlying protective coating to the substrate is reduced such that coating spalls or peels away from the underlying substrate as is shown at 22. With the loss of the thermal barrier layer, the underlying material is exposed to higher temperatures, which accelerates further deterioration by oxidation and diffusion and spalling, with eventual failure.

Although the example in FIG. 1 has been set forth in terms of a monolithic SiC, the mechanism for formation of voids and spalling is similar for composites such as SiC/SiC composites and other nonmetallic materials that include an oxidizable component. The mechanism is identical or similar. As the oxidizable component, C for SiC, oxidizes at high temperatures, the material is converted into a gas, CO or $CO_2$ for SiC, and a more stabile oxide such as a ceramic material, silica in the above example. Associated with this transformation is the formation of voids. These voids 18 can form in the oxide scale, silica 16, and the external coating 14, at interfaces between the scale 16 and the substrate matrix 12 or between fibers 12 and the matrix 12 when reinforcing fibers are added to the matrix. However, at elevated temperatures, these voids can migrate and aggregate into the external coating 14, in the interfacial silica scale 16 as well as at the interfaces therebetween.

Figure 2:
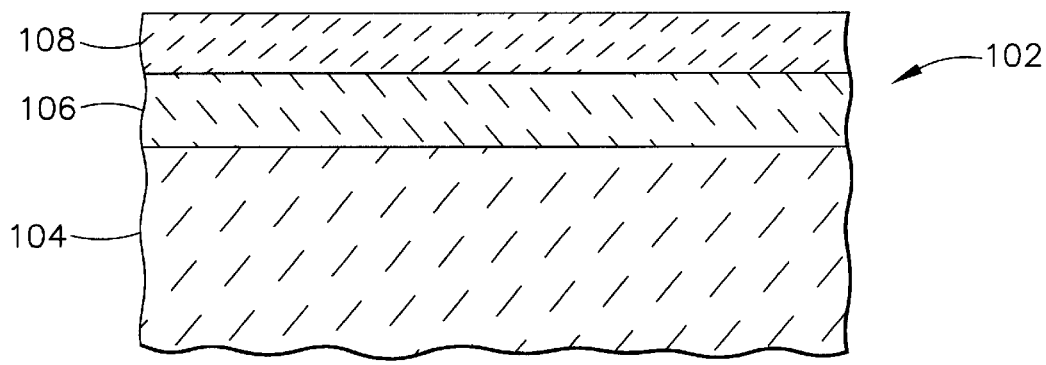
FIG. 2 is a turbine component in which the oxidizable substrate includes an outer coating applied over the dense silica layer.

The present invention minimizes the formation of voids by substantially reducing the mechanism for void formation in oxidizable nonmetallic substrates. Referring now to FIG. 2, a turbine engine component 102 is comprised of a nonmetallic substrate 104. The nonmetallic substrate includes at least one oxidizable component. Such a substrate can be a monolithic ceramic such as a silicon carbide or a silicon nitride. Alternatively, the material may be a fiber matrix composite in which the strengthening fibers are comprised of an oxidizable material such as graphite, silicon carbide or silicon nitride and the matrix is a material selected from the group consisting of metallic materials and ceramic materials which may or may not be oxidizable. Alternatively, the matrix material may be oxidizable, such as silicon nitride or silicon carbide, while the fibers may be a non-oxidizable material, such as a ceramic, sapphire, or a metal. Of course, both the fiber and the matrix may be oxidizable, as when a component is made from SiC/SiC material.

In order to minimize the formation of voids, the nonmetallic material is coated with a layer of densified material 106 that has a very low rate of oxygen diffusion. This densified layer may be a material such as silica or alumina, both of which are substantially impervious to penetration by oxygen. This densified material differs from material such as a silica formed by thermal transformation of SiC or SiN by oxidation in that it is substantially non-porous and void free. The densified silica can also be made so as to be substantially crack-free, if desired. The densified silica 106, applied as a dense layer, is chemically compatible with the matrix so as to form a strong bond with the matrix. It is applied to at least those portions of the component exposed to the hot, oxidizable gases of combustion. For example, a turbine component such as a combustor liner only must be coated on that portion of the liner exposed to the hot exhaust gases of combustion. Overlying the densified layer 106 is a thermal barrier coating 108 compatible with the densified layer 106. These thermal barrier coatings 108 typically are compatible with densified layers such as silica or alumina and can include zirconia-based coatings such as yttrium-stabilized zirconia (YSZ).

The dense layers are applied in different thicknesses by different processes to achieve different results. Silica and alumina are brittle material and can include cracks, which can provide unwanted diffusion paths for oxygen. As previously noted, the densified layer can be applied by a process that yields a substantially crack-free layer. This is best achieved by applying silica or alumina by CVD process or by physical vapor deposition. These processes achieve substantially crack-free densified layers in thicknesses of from about 3 microns to about 100 microns and more typically from about 5–15 microns. When some minor cracking can be tolerated, the densified layer can be applied by plasma spray, sputtering or by the sol-gel process. The sol-gel process can produce a densified layer of from 20–100 microns and more typically from about 20–25 microns, while sputtering and the plasma spray process yields a dense coating having a thickness of about 1–3 mils.

Figure 3:
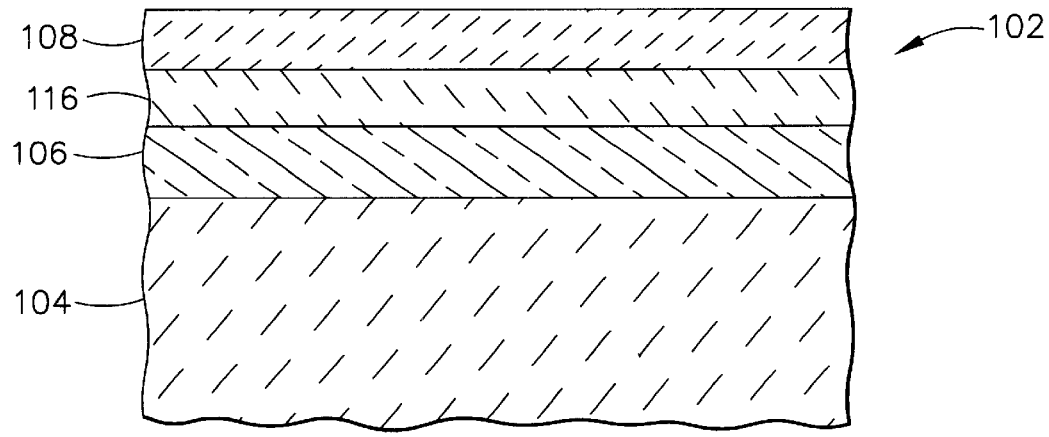
FIG. 3 is a turbine component in which the oxidizable substrate includes an intermediate layer overlying the dense silica layer.

When cracks cannot be tolerated and parts cannot be processed by CVD or sputtering, or when a thick layer is required, an alternate embodiment of the present invention can be prepared as set forth in FIG. 3. In this embodiment, a layer of mullite, $2Al_2O3-2SiO_2$, can be applied to the component. In the preferred embodiment, a layer of mullite 116, which can be as thin as 5 microns, is interposed between the silica layer 106 and the thermal barrier layer 108. The mullite can be heated to form a glass that will fill the cracks and inhibit diffusion of oxygen along the cracks. In an alternative embodiment, the mullite can be inserted between the silica layer 106 and the substrate 104 to accomplish the same purpose.

Preferably, the adhesion of the densified layer to the substrate surface can be improved by treating the substrate surface. This can be done by etching the substrate surface or by grooving the substrate surface using a method such as is set forth in U.S. Pat. No. 5,419,071, assigned to the assignee of the present invention. The adhesion can be improved by assuring the all dirt and impurities have been removed from the substrate surface prior to application of the densified layer.

The present invention permits the use of oxidizable materials such as SiC and SiN in applications in which the temperature can reach 3000° F. This represents a 600° F. increase over present applications, which is a significant improvement over current uses, allowing the use of these materials in applications not previously considered. The additional advantage. is that current metal components can be replaced with lightweight composite components to reduce the weight of the engine, thereby improving specific fuel performance.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for improving the adherence of thermal barrier coatings to a non-metallic substrate in an oxidizing, high temperature environment, comprising the steps of:

providing a nonmetallic substrate having at least one oxidizable component;

applying a dense coating of a material selected from the group consisting of silica and alumina having a low diffusivity of oxygen by a process that does not form voids to each surface of the nonmetallic substrate exposed to the oxidizing, high temperature environment;

applying a thermal barrier coating to the dense coating having a low diffusivity of oxygen.

2. The method of claim 1 wherein the step of providing a nonmetallic substrate includes providing a substrate selected from the group consisting of a silicon carbide substrate and silicon nitride substrate.

3. The method of claim 1 wherein the step of providing a nonmetallic substrate having at least one oxidizable component includes supplying a ceramic matrix composite having at least one oxidizable component.

4. The method of claim 3 wherein the at least one oxidizable component is a carbon-containing material.

5. The method of claim 4 wherein the carbon-containing material is a refractory carbide.

6. The method of claim 5 wherein the refractory carbide is selected from the group consisting of zirconium carbide, silicon carbide and hafnium carbide.

7. The method of claim 3 wherein the ceramic matrix composite is fiber reinforced.

8. The method of claim 7 wherein the ceramic matrix includes an oxidizable component.

9. The method of claim 7 wherein the oxidizable component of the ceramic matrix is a carbon-containing material.

10. The method of claim 9 wherein the carbon containing material is selected from the group consisting of zirconium carbide, silicon carbide and hafnium carbide.

11. The method of claim 7 wherein the reinforcing fiber is oxidizable.

12. The method of claim 11 wherein the oxidizable fiber is a carbon-containing fiber.

13. The method of claim 12 wherein the carbon-containing fiber is a refractory carbide fiber.

14. The method of claim 13 wherein the refractory carbide fiber is selected from the group of fibers consisting of zirconium carbide fibers, silicon carbide fibers and hafnium carbide fibers.

15. The method of claim 11 wherein the oxidizable fiber is silicon nitride.

16. The method of claim 1 wherein the step of applying a dense coating by a process that does not form voids includes at least one process selected from the group consisting of the sol gel, plasma spraying, chemical vapor deposition, physical vapor deposition and sputtering.

* * * * *